(12) United States Patent
Singh et al.

(10) Patent No.: US 7,120,915 B1
(45) Date of Patent: Oct. 10, 2006

(54) THREAD SWITCH CIRCUIT DESIGN AND SIGNAL ENCODING FOR VERTICAL THREADING

(75) Inventors: Gajendra P. Singh, Sunnyvale, CA (US); Joseph I. Chamdani, Santa Clara, CA (US); Renu Raman, Los Altos, CA (US); Rabin A. Sugumar, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 995 days.

(21) Appl. No.: 09/716,545

(22) Filed: Nov. 20, 2000

Related U.S. Application Data

(63) Continuation-in-part of application No. 09/638,338, filed on Aug. 14, 2000, now Pat. No. 6,420,903.

(51) Int. Cl.
  *G06F 9/46* (2006.01)
  *G06F 9/40* (2006.01)
  *G06F 9/44* (2006.01)

(52) U.S. Cl. .................... 718/108; 718/107; 712/244; 712/228

(58) Field of Classification Search ............... 712/43, 712/229, 228, 218, 219, 244; 718/107, 108, 718/106; 326/93; 327/211
See application file for complete search history.

(56) References Cited

U.S. PATENT DOCUMENTS 6,341,347 B1 * 1/2002 Joy et al. .................... 712/228
6,351,808 B1 * 2/2002 Joy et al. .................... 712/228
6,420,903 B1 * 7/2002 Singh et al. .................. 326/93
6,433,603 B1 * 8/2002 Singh et al. ................ 327/211
6,507,862 B1 * 1/2003 Joy et al. .................... 718/107

FOREIGN PATENT DOCUMENTS

WO WO 00/68780 * 11/2000

* cited by examiner

*Primary Examiner*—Larry D. Donaghue
(74) *Attorney, Agent, or Firm*—Osha Liang LLP

(57) ABSTRACT

A method and apparatus for implementing vertical multi-threading in a microprocessor without implementing additional signal wires in the processor has been developed. The method uses a pre-existing signal to serve as a multi-function signal such that the multi-function signal can be used for clock enable, clock disable, and scan enable functions. The single multi-function signal exhibits multiple functionalities as needed by a flip-flop to operate in a plurality of modes. The method allows for the use of a pre-existing signal wire to be used as a process thread switch signal that would otherwise have to be explicitly hard-wired in the absence of the multi-functioning signal. The method further includes allowing multiple-bit flip-flops to be placed at sequential stages in a pipeline in order to facilitate vertical multi-threading and, in effect, increase processor performance. The apparatus provides means for distinguishing between specific characteristics exhibited by the multi-function signal. The apparatus further provides means for generating intermediary signals within a control block and then generating output signals to a data storage block. The apparatus also involves generating timing signals to a plurality of flip-flops dependent upon the behavior of the multi-function signal.

38 Claims, 5 Drawing Sheets

THREAD SWITCH CIRCUIT DESIGN AND SIGNAL ENCODING FOR VERTICAL THREADING

CROSS-REFERENCE TO RELATED APPLICATIONS

This application is a continuation-in-part to U.S. patent application Ser. No. 09/638,338, filed on Aug. 14, 2000 now U.S. Pat. No. 6,420,903, and claims the benefit, pursuant to 35 U.S.C. § 120, of that application.

BACKGROUND OF THE INVENTION

A modern computer system comprises a microprocessor, memory, and peripheral computer resources, i.e., monitor, keyboard, software programs, etc. The microprocessor comprises arithmetic, logic, and control circuitry that interpret and execute instructions from a computer program. FIG. 1 shows a prior art diagram of an example of a computer's microprocessor (20) that has, among other components, a central processing unit ("CPU") (22), a memory controller (24), also known as a load/store unit, and on-board, or level 1, cache memory (26). The microprocessor (20) is connected to external, or level 2, cache memory (28), and the processor is also connected to the main memory (30) of the computer system. Cache memory is a region of fast memory that holds copies of data.

One goal of the computer system is to execute instructions provided by the computer's users and software programs. The execution of instructions is carried out by the CPU (22). Data needed by the CPU (22) to carry out an instruction are fetched by the memory controller (24) and loaded into the internal registers (32) of the CPU (22). Upon command from the CPU (22), the memory controller searches for data first in the fast on-board cache memory (26), then in the slower external cache memory (28), and if those searches turn out unsuccessful, then the memory controller (24) retrieves the data from the slowest form of memory, the main memory (30).

The time between a CPU request for data and when the data is retrieved and available for use by the CPU is referred to as the "latency" of the system. If requested data is found in cache memory, i.e., a data "hit" occurs, then the requested data can be accessed at the speed of the cache memory and the overall latency of the system is decreased. On the other hand, if requested data is not found in the cache memory, i.e., a data "miss" occurs, then the data must be retrieved from the relatively slow main memory, and the overall latency of the system in increased.

Because the CPU runs at significantly greater speeds than either cache memory or main memory, a significant portion of the CPU's time is spent waiting for data to be retrieved from one of the various forms of memory. In order to combat this performance-inhibiting phenomenon, various techniques have been employed to increase computing performance and efficiency. For example, many processors now incorporate superscalar architecture. Superscalar processors allow the simultaneous execution of multiple instructions. Additionally, processors now fetch multiple instructions, via an instruction fetch unit and an instruction scheduler, instead of executing one instruction and waiting for the next instruction to be fetched. A program sequence of instructions is referred to as a "process thread."

Another technique that has been employed to increase computer performance involves combining multiple processors into a single system. Each processor is capable of executing a particular sequence of instructions in a program or program segment. This technique is often referred to as "horizontal" multi-threading.

An alternative processor performance enhancing technique is "vertical" multi-threading. Vertical multi-threading is a technique in which a single processing pathway, known as a "pipeline," is used by more than one process thread. A capacity for vertical multi-threading exists because a process thread is not always actively executing. A process may be in a wait state awaiting either data or an event, such as a trap or interrupt. Because some applications have frequent cache misses, which result in heavy clock penalties, i.e., increased latency, a most desirable condition is that a second process thread should utilize the processor while a first process thread is waiting for the arrival of data or an event.

For example, in data processing applications with frequent cache misses, data is accessed through a secondary memory storage structure, often the main memory, resulting in heavy clock penalties, i.e., higher latency. During data accessing delays, a beneficial usage of the pipeline is to allow a second process thread to execute. The second process thread can take over the idle pipeline by saving all useful states of the first process thread in some location and assigning new states to the new process thread. When the second process thread becomes idle and the first process thread returns to processing, saved states are returned to the pipeline and the pipeline resumes its execution of the first process thread.

Vertical multi-threading requires that states for the first process thread be saved in some location before execution of the second process thread. Additionally, states for the second process thread must be saved in some location before returning to the execution of the first process thread.

A vertical multi-threading processor includes one or more execution pipelines that are formed from a plurality of multiple-bit flip-flops (discussed below). The flip-flops contain multiple storage bits. These individual bits of the flip-flops store data for one of the many process threads that are in a pipeline at any given time. When an executing process thread halts due to a stall condition, such as a cache miss, an active bit of the multiple-bit flip-flop at that stage is correspondingly stalled, removed from activity on the pipeline, and a previously inactive bit becomes active for executing a previously inactive process thread. Vertical multi-threading is thus attained by inserting multiple-bit flip-flops at sequential stages in a pipeline.

Referring to FIG. 2, a prior art multiple-bit flip-flop is shown. The multiple-bit flip-flop (34) is an integrated circuit device that has two representative blocks: a header block (also known as the driver block) (36) and a data storage block (38). The header block (36) is coupled to the data storage block (38) and it drives, i.e., controls, the flip-flop block (38). The data storage block (38) comprises a plurality of storage elements that hold data for multiple process threads.

The input signals to the header block (36) include a clock ("L4CLK") signal, a scan enable ("SE") signal, and a clock enable ("CE") signal. The header block (36) outputs a scan clock ("SCLK") signal, an inverse scan clock ("SCLK_L") signal, a pulse clock ("PCLK") signal, and an inverse pulse clock ("PCLK_L") signal. The output signals from the header block (36) serve as inputs to the data storage block (38) in addition to a data ("DATA") and scan chain in ("SI") signal which come from circuitry external to the multiple-bit flip-flop (34).

L4CLK is a timing signal that is generated from a CPU clock frequency. L4CLK is provided to be used as a time basis for the header block (36) in generating different timing signals to the data storage block (38). SE, the scan enable signal, is used by the header block (36) to determine when the multiple-bit flip-flop (34) should enter into a scan mode. The scan mode is necessary when the contents of the data within the data storage block (38) need to be scanned. When SE is asserted, the header block (36) pulses SCLK and SCLK_L to indicate to the data storage block (38) to select the SI input and scan data using SCLK and SCLK_L as time references.

CE, the clock enable signal, is used by the header block (36) to determine when the multiple-bit flip-flop (34) should operate in normal (non-scan) mode. When CE is asserted, the header block (36) pulses the PCLK and PCLK_L to indicate to the data storage block (38) to select the DATA input and input data using PCLK and PCLK_L as time references. The above discussion regarding the scan mode and normal mode operations of the multiple-bit flip-flop (34) indicates that SE and CE are mutually exclusive and that only one can be asserted at any given time.

In order to facilitate vertical multi-threading using the multiple-bit flip-flop (34) with the discussed header block (36) and data storage block (38), a mechanism is needed to convey to the stages of the processor when to switch from one process thread to another process thread. The header block (36) comprises circuitry that is capable of driving a storage element in the data storage block (38) when selected by a switch while data in one or more storage elements that are not selected by the switch are held in their respective storage elements. This switch signal is generated by a state machine that is routed to different stages of the processor. Consequently, the signal for process thread switching is hard-wired into the CPU. Hard-wiring an additional signal into the CPU requires that the layout of the existing CPU be modified to accommodate the additional signal wire (or connection).

SUMMARY OF THE INVENTION

In one aspect, the present invention relates to a method for implementing vertical multi-threading in a processor pipeline without significant architectural modifications to the pipeline. The vertical threading scheme uses multiple-bit flip-flops that require a thread switch signal in order to switch process threads as required by the vertical threading scheme. Because the multiple-bit flip-flops must be present at every stage in a pipeline, the invention by not requiring the implementation of additional signal wires external to the multiple-bit flip-flops, minimizes the amount of redesigning of processor architecture needed to implement vertical multi-threading.

In another aspect, the present invention relates to a method for increasing processor performance. By minimizing the amount of redesigning needed to implement vertical multi-threading, the invention encourages the implementation of vertical multi-threading, and therefore, the processor can execute more instructions in parallel and spend less time idle waiting for process thread dependencies. In effect, vertical threading increases process thread execution efficiency.

According to another aspect, the present invention relates to a method for combining multiple functionalities into one physical signal. The method further includes using the multi-function signal to determine what mode a multiple-bit flip-flop should operate in. The method further includes using the distinguishing characteristics of the multi-function signal to make a determination as to what function the multi-function signal serves at a given point in time in the processor pipeline.

In another aspect, the present invention relates to a method for converting an existing microprocessor without vertical threading into a processor with vertical threading with minimal changes to the existing processor.

Other aspects and advantages of the invention will be apparent from the following description and the appended claims.

DETAILED DESCRIPTION OF THE INVENTION

The present invention primarily relates to a method for using a single physical signal to denote multiple functionalities in a multiple-bit flip-flop. The multiple-bit flip-flop distinguishes between the multiple characteristics of the single physical signal to determine when operations should take place and what modes of operation should take place at a given point in time. By using a single physical wire for multiple functions, a process thread switch signal can be implemented without incorporating an additional wire into a microprocessor. Moreover, the method allows the microprocessor to achieve vertical multi-threading without redesigning the entire microprocessor.

Figure 1:
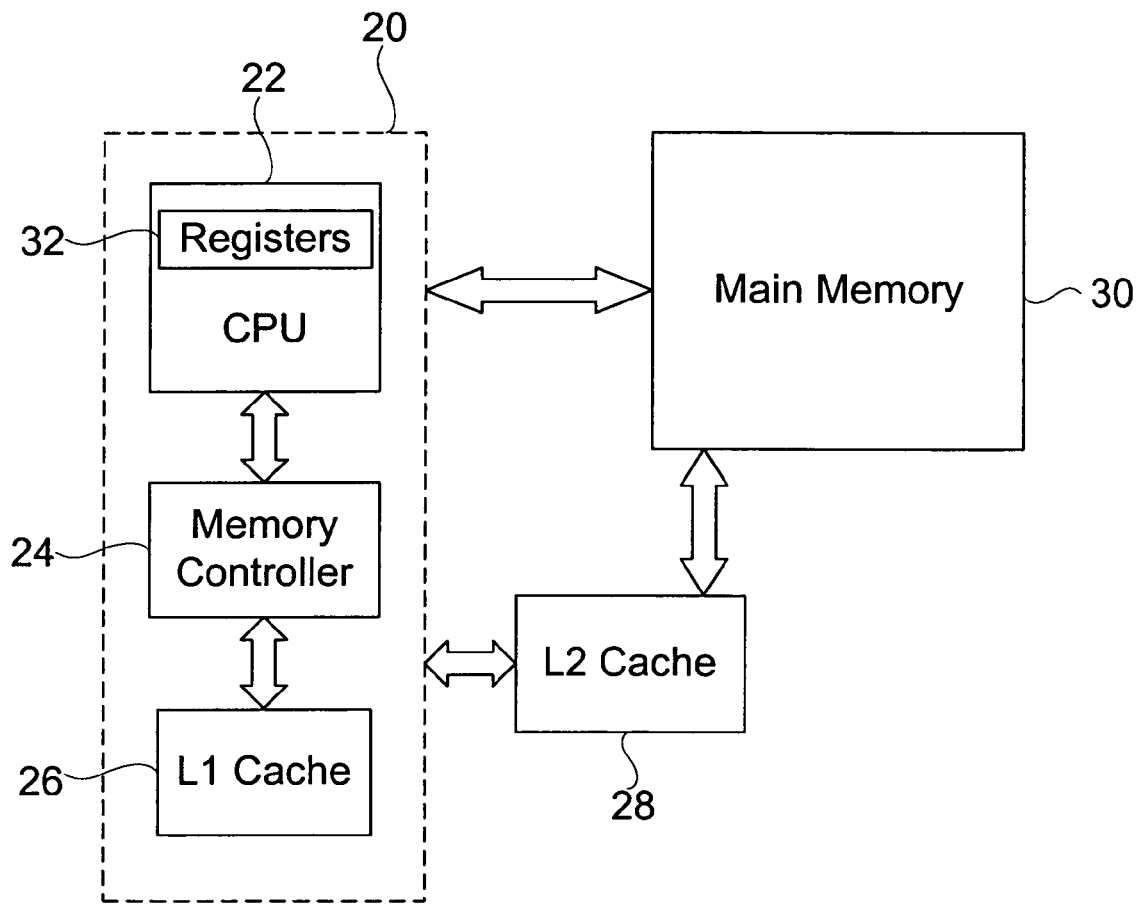
FIG. 1 is a prior art illustration of a microprocessor.
Figure 2:
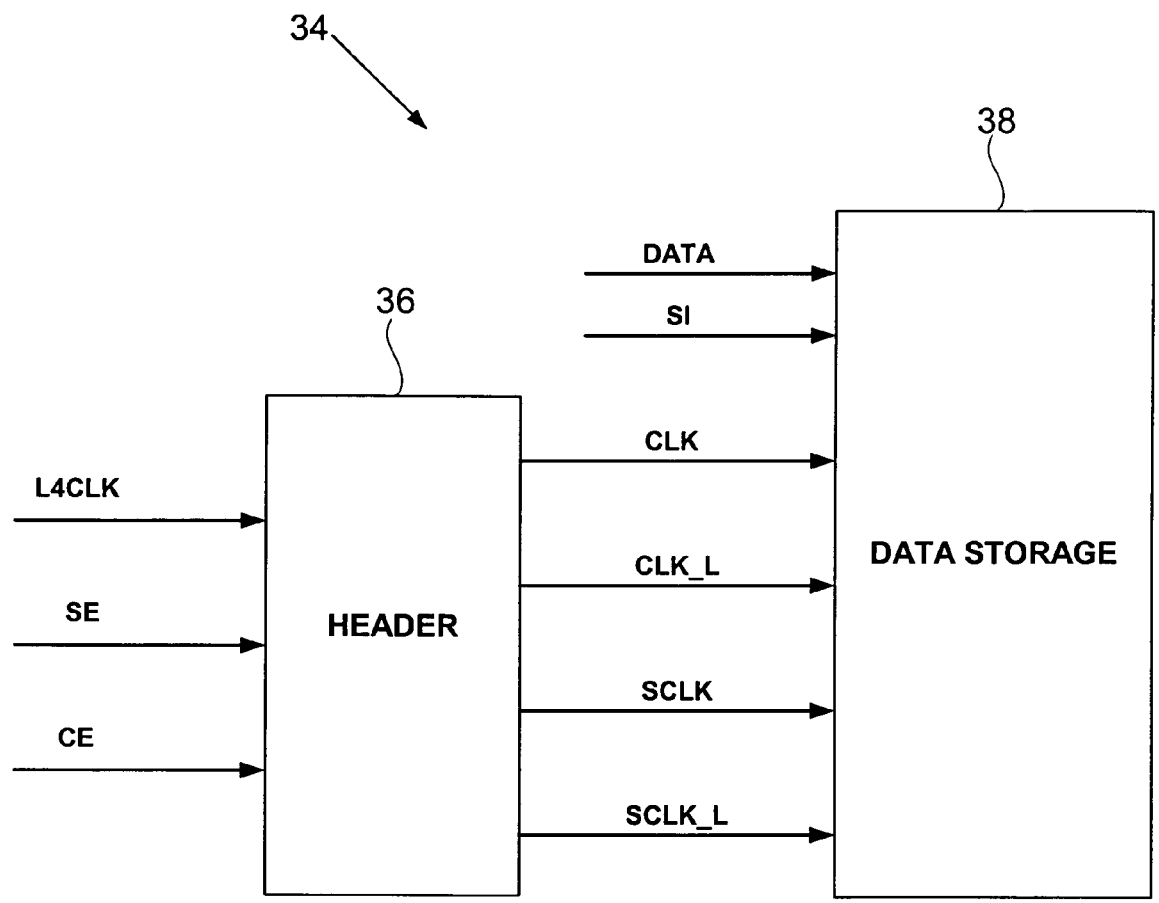
FIG. 2 is a block diagram of a prior art multiple-bit flip-flop.
Figure 3:
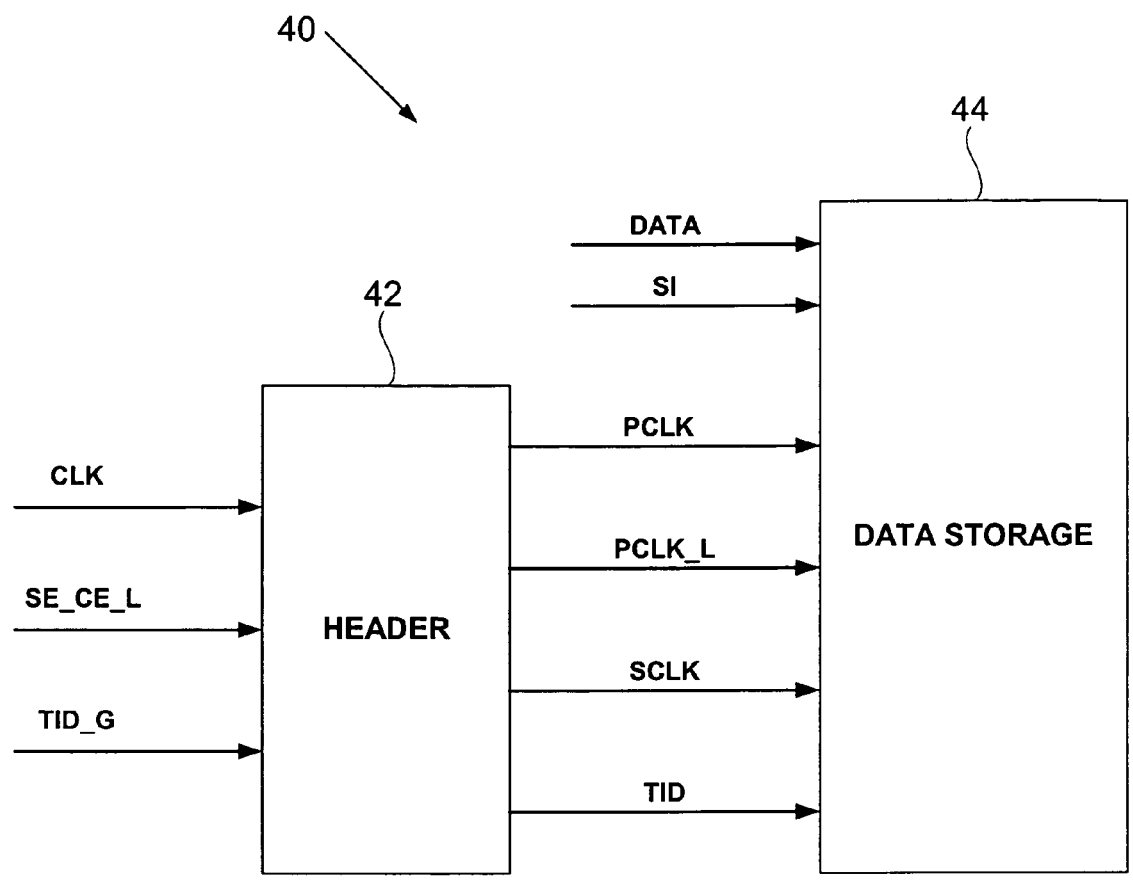
FIG. 3 is a schematic block diagram of a multiple-bit flip-flop in accordance with an embodiment of the present invention.

Referring to FIG. 3, a schematic block diagram of a multiple-bit flip-flop (40) is shown in accordance with one embodiment of the present invention. The figure illustrates that the multiple-bit flip-flop (40) comprises two representative blocks: a header, or clock/control, block (42) and a data storage block (44). The clock/control header block (42) supplies timing signals and process thread select/switch signals to the data storage block (44). The data storage block (44) comprises one or more storage elements (not shown). Typically, the storage elements are capable of storing data for a plurality of process threads.

Input signals to the clock/control header block (42) comprise a clock signal ("CLK"), which is a signal generated from circuitry external to the multiple-bit flip-flop (40), a multi-functioning signal ("SE_CE_L"), and a global thread identifier signal ("TID_G") that is supplied from thread select circuitry external to the multiple-bit flip-flop (40). The clock/control header block (42) generates an internal flip-flop timing pulse signal ("PCLK"), the inverse of the internal flip-flop timing pulse signal ("PCLK_L"), a scan select signal ("SCLK"), and a local thread identifier signal ("TID").

The SCLK signal is derived internally in the clock/control header block (42) using the external CLK signal. A combined scan enable and clock enable signal, SE_CE_L, is indirectly used to determine when SCLK should be asserted (discussed below). The clock/control header block (42) asserts an internally generated, local thread identifier signal ("TID") to the data storage block (44) based on the global thread identifier signal, TID_G. The clock/control header block (42) drives one or more data storage elements in the data storage block (44) dependent upon the mode of operation the multiple-bit flip-flop (40) is in and the behavior of TID_G. Typically, the data storage block (44) comprises between 1 and 32 bistable multivibrator cells. However, those skilled in the art will appreciate that in alternative embodiments, more cells may be used.

The internal flip-flop timing pulse signal, PCLK, the inverse of the internal flip-flop pulse signal, PCLK_L, the scan select signal, SCLK, and the internal, local thread ID signal, TID, are supplied from the clock/control header block (42) to the data storage block (44).

In addition to the internal flip-flop timing pulse signal, PCLK, the inverse of the internal flip-flop pulse signal, PCLK_L, the scan select signal, SCLK, and the internal, local thread ID signal, TID, the data storage block (44) also receives a data input signal ("DATA") and a scan chain input signal ("SI") from circuitry external to the multiple-bit flip-flop (40).

A more detailed discussion regarding the functions and behaviors of the signals involved with the multiple-bit flip-flop (40) is given below with reference to FIG. 5.

The present invention, by combining scan enable, clock enable, and clock disable functions into one signal wire, allows the microprocessor to be designed without significant modifications to the processor area external to the multiple-bit flip-flop (40). Vertical multi-threading can be implemented with minimal changes to the processor with reference to area usage, number of transistors, and signal layout, because the essential process thread switch signal can be implemented using a wire that was devoted to a different function in the prior art. Therefore, an additional wire does not need to be implemented to incorporate the process thread switch function.

Figure 4:
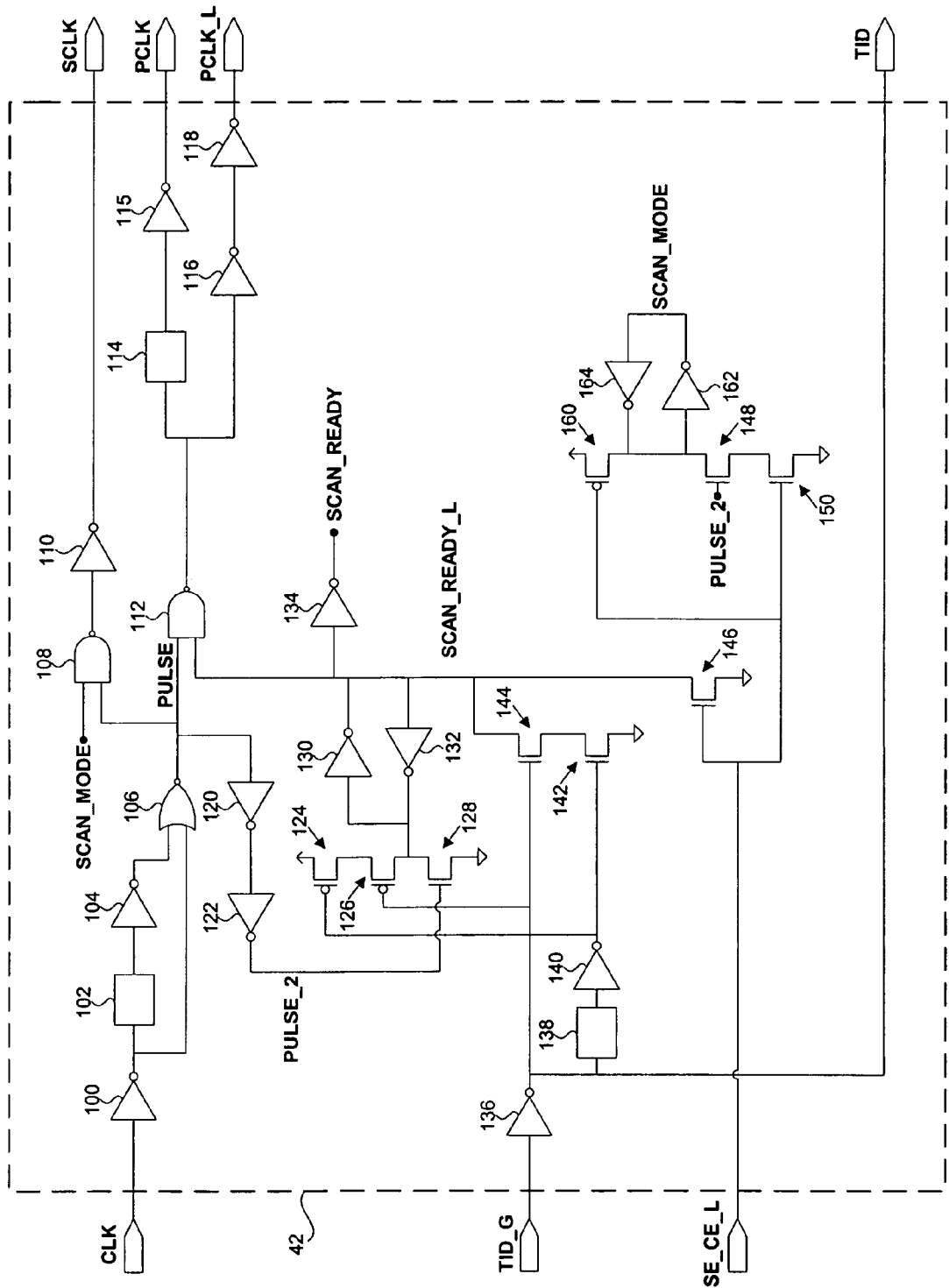
FIG. 4 is a circuit schematic of a header block of a multiple-bit flip-flop in accordance with an embodiment of the present invention.

Referring to FIG. 4, a circuit schematic is shown of the header block (42) of the multiple-bit flip-flop (40) in accordance with an exemplary embodiment of the present invention.

A clock signal, CLK, serves as an input to the header block (42). CLK is inputted into an inverter INV_1 (100). INV_1 (100) inverts CLK, and then outputs the inverted CLK signal to a pass gate, PASS_1 (102), and a NOR gate, NOR_1 (106). PASS_1 (102) and another inverter, INV_2 (104), are used to delay a signal passing along the branch comprising PASS_1 (102) and INV_2 (104) relative to the signal passing directly from INV_1 (100) to NOR_1 (106). Additionally, INV_2 (104) outputs to an input of NOR_1 (106). NOR_1 (106) generates a pulse signal, PULSE, which is used by the circuitry in the header block (42) for operation timing references.

In an exemplary embodiment of the present invention, if CLK is initially low, then INV_1 (100) outputs high and an input to NOR_1 (106) is accordingly high since there is at least one direct signal path between INV_1 (100) and NOR_1 (106). Along the branch comprising PASS_1 (102) and INV_2 (104), PASS_1 (102) inputs the high signal from INV_1 (100) and selectively delays that high signal, i.e., generates a phase shift between the input signal to PASS_1 (102) and the output signal from PASS_1 (102). Then, INV_2 (104) inputs the signal from the output of PASS_1 (102) and inverts that signal. It follows that for this exemplary embodiment, INV_2 (104) generates a low signal to an input of NOR_1 (106) since INV_2 (104) receives a high signal from PASS_1 (102). Next, NOR_1 (106) generates a low PULSE signal due to the fact that at least one input of NOR_1 (106) is high. In the case that CLK goes high from its initial low state, INV₁ 1 (100) outputs a low signal and that low signal gets directly passed to NOR_1 (106). During the time interval in which the low signal from INV_1 (100) propagates to an input of NOR_1 (106) along the branch comprising PASS_1 (102) and INV_2 (104), both inputs to NOR_1 (106) are low since one input to NOR_1 (106) is low from the output of INV₁ 1 (100) and an another input to NOR_1 (106) remains low from the time when CLK was low. During this interval in which all inputs to NOR_1 (106) are low, NOR_1 (106) generates a high PULSE signal. As the low signal from INV_1 (100) propagates through PASS_1 (102) and INV_2 (104), a high signal is generated by INV_2 (104) to an input of NOR_1 (106), wherein NOR_1 (106) then generates a low PULSE signal. In summary, when CLK goes high from a low state, PULSE goes from a low state to a high state back to a low state. In other words, PULSE is asserted high at rising edges of CLK.

The SCAN_READY_L node shown in FIG. 4 is used by the header block (42) to determine when PCLK and PCLK_L should be asserted. Connected to the SCAN_READY_L node is an inverter, INV_5 (134), which inverts the value on the SCAN_READY_L node and generates SCAN_READY. The value on the SCAN_READY_L node is inputted into a NAND gate, NAND_1 (112). The value of PULSE also serves as an input to NAND_1 (112). When the value on SCAN_READY_L is high, NAND_1 (112) outputs the inverse value of PULSE. While the value on SCAN_READY_L is high and PULSE is pulsing, NAND_1 (112) generates a signal that pulses in accordance with PULSE. This pulsing signal serves as an input to a pass gate, PASS_3 (114), and an inverter INV_6 (116). PASS_3 (114) is used to balance the delay encountered by the pulsing signal passing through INV_6 (116) so that the inputs to the other inverters, INV_7 (115) and INV_8 (118), arrive at the same time at their respective gates. This is to ensure that PCLK and PCLK are synchronous in their behavior, i.e., when PCLK is high, PCLK_L is always low, and when PCLK is low, PCLK_L is always high. Hence, when the value on the SCAN_READY_L node is high and PULSE is pulsing, PCLK pulses and PCLK_L pulses inverse to the pulse of PCLK.

When the value on the SCAN_READY_L node is low, NAND_1 (112) generates a high signal, which in effect, via PASS_3 (114) and INV_7 (115), causes PCLK to be killed, i.e., the value of PCLK is held low.

A global thread identifier signal, TID_G, serves as an input to the header block (42). TID_G is inputted into an inverter, INV_3 (136), which inverts the TID_G signal and passes it to a NMOS device, NMOS_1 (144), a PMOS device, PMOS_1 (126), a pass gate, PASS_2 (138), and to a local thread identifier output, TID. PASS_2 (138) inputs an incoming signal, selectively delays it, and outputs it to an inverter, INV_4 (140). INV_4 (140) then generates an output signal that is passed to another NMOS device, NMOS_2 (142), and a PMOS device, PMOS_2 (124).

In an exemplary embodiment of the present invention, if TID_G goes from high to low, then INV_3 (136) outputs high. When the output of INV_3 (136) is high, NMOS_1 (144) is switched on. PASS_2 (138) inputs the high signal from INV_3 (136), delays it, and then passes it to INV_4 (140). During the delay between when PASS_2 (138) inputs the high signal and outputs the delayed high signal, INV_4 (140) outputs high since it outputted high when TID_G was high. In other words, the delay generated by PASS_2 (138)

causes the input of INV_4 (140) to not be immediately affected by a change in TID_G. It follows that for the relatively brief period of time that INV_4 (140) outputs high, both NMOS_1 (144) and NMOS_2 (142) receive high inputs. When the inputs to both NMOS_1 (144) and NMOS_2 (142) are high, NMOS_1 (144) and NMOS_2 (142) are both switched on, which, in effect, causes the value on the SCAN_READY_L node to go low. More specifically, when NMOS_1 (144) and NMOS_2 (142) are both 'on', a connection is created between the ground node directly connected with NMOS_2 (142) and the SCAN_READY_L node. However, as soon as PASS_2 (138) outputs the high signal it received from INV_3 (136) to INV_4 (140), INV_4 (140) outputs a low signal and accordingly NMOS_2 (142) switches 'off' causing an open circuit to be created between the ground node connected to NMOS_2 (142) and NMOS_1 (144). In summary, when TID_G goes from high to low, SCAN_READY_L is driven low for one clock cycle, and this causes PCLK to be deactivated for one clock cycle (discussed above).

When TID_G goes from low to high, INV_3 (136) outputs a low signal to PMOS_1 (126), NMOS_1 (144), PASS_2 (138), and TID. Since INV_3 (136) outputs a low signal to NMOS_1 (144), NMOS_1 (144) is 'off.' The low signal from INV_3 (136) also serves as an input to PMOS_1 (126). This low signal causes PMOS_1 (126) to turn 'on.' While the low signal from INV_3 (136) is being delayed by PASS_2 (138), an inverter, INV_4 (140) outputs low since it has not yet been affected by the change in TID_G. The output of INV_4 (140) serves as an input to PMOS_2 (124). During the delay between when the low signal from INV_3 (136) inputs PASS_2 (138) and arrives at INV_4 (140), PMOS_2 (124) receives a low signal from INV_4 (140), which, in effect, causes PMOS_2 (124) to turn 'on.' When both PMOS_1 (126) and PMOS_2 (124) are 'on,' the input to an inverter, INV_9 (130), is driven high. INV_9 (130) then inverts the high signal and drives the value on the SCAN_READY_L node low. However, once PASS_2 (138) outputs the low signal it received from INV_3 (136), INV_4 (140) outputs a high signal, which, in effect, switches PMOS_2 (124) 'off.' When PMOS_2 (124) is switched 'off,' the input to INV_9 (130) is driven low. Then, INV_9 (130) inverts the low signal and outputs a high signal such that the value on SCAN_READY_L node is unaffected by the output of INV_9 (130). The value on the SCAN_READY_L node also serves as input to another inverter, INV_10 (132). INV_10 (132) outputs to the input of INV_9 (130). In summary, when TID_G goes from low to high, the value on the SCAN_READY_L node is driven low for one clock cycle causing PCLK to be killed for one clock cycle.

From the preceding discussion regarding TID_G, an embodiment of the present invention requires that PCLK be deactivated for one clock cycle whenever TID_G toggles, i.e., goes from high to low or from high to low.

PULSE is inputted into an inverter, INV_11 (120), which, in turn, outputs to the input of another inverter, INV_12 (122). Thereupon, INV_12 (122) generates PULSE_2. When PULSE is asserted high, PULSE_2 goes high after a propagation delay due to a signal passing through INV_11 (120) and INV_12 (122). When PULSE_2 is high, an NMOS device, NMOS_3 (128) is switched 'on.' PULSE_2 is used to continuously reset the value on the SCAN_READY_L node, via INV_9 (130), to go high. Since PULSE always pulses as long as CLK is active, PULSE_2 also continuously pulses, and this causes NMOS_3 (128) to continuously turn 'on' and drive the value on the SCAN_READY_L node high. However, when TID_G toggles before PULSE_2 goes high, the value on the SCAN_READY_L node is driven low (discussed above) and PCLK is deactivated. Yet as soon as PULSE_2 goes high, the value on the SCAN_READY_L node is driven high and PCLK is reactivated.

A multi-functioning signal, SE_CE_L, is inputted into the header block (42). SE_CE_L serves as an input to a NMOS device, NMOS_4 (146), another NMOS device, NMOS_5 (150), and a PMOS device, PMOS_3 (160). As soon as SE_CE_L goes high, NMOS_4 (146) switches 'on,' and the value on the SCAN_READY_L node is driven low since there is a ground terminal connected directly to NMOS_4 (146). Correspondingly, when SCAN_READY_L is low, PCLK is deactivated. If SE_CE_L goes from high to low before the end of a cycle, then PULSE_2 will reset the value on the SCAN_READY_L node to high, and PCLK will be reactivated.

However, in the case that SE_CE_L remains high for more than one cycle, NMOS_5 (150) will be switched 'on.' When PULSE_2 goes high, another NMOS device, NMOS_6 (148), switches 'on' causing the ground terminal connected directly to NMOS_5 (150) to connect with an input to an inverter, INV_13 (162). It follows that when NMOS_5 (150) and NMOS_6 (148) are both on, INV_13 (162) will output a high value on a SCAN_MODE node. In other words, when SE_CE_L is high for more than one cycle, SCAN_MODE goes high. If and when SE_CE_L goes low, NMOS_4 (146) switches 'off' and PMOS_3 (160) switches 'on.' When PMOS_3 (160) switches 'on,' there is a direct connection between the power terminal connected to PMOS_3 (160) and the input to INV_13 (162). In this case, when the input to INV_13 (162) is high, INV_13 (162) outputs a low value on the SCAN_MODE node. Another inverter, INV_14 (164) inputs the value on the SCAN_MODE node and outputs to a node connecting PMOS_3 (160) and NMOS_6 (148).

In summary, with regard to SE_CE_L in this exemplary embodiment, when SE_CE_L is high, PCLK is deactivated. If SE_CE_L is high for less than one cycle, then PULSE_2 resets the value on the SCAN_READY_L node to high at the end of the cycle in which SE_CE_L went high and PCLK is reactivated. However, if SE_CE_L is high for more than one cycle, then SCAN_MODE goes high and remains high until SE_CE_L goes low.

The value of SCAN_MODE also serves as an input to a NAND gate, NAND_2 (108). NAND_2 (108) also inputs PULSE. If SCAN_MODE is low, then NAND_2 (108) outputs high to an inverter, INV_15 (110), which in turn inverts the low SCAN_MODE signal and generates a low SCLK signal. However, when SCAN_MODE is high, NAND_2 (108) generates a pulsing signal according to the behavior of PULSE. This pulsing signal is inverted by INV_15 (110), and INV_15 (110), in turn, generates a pulsing SCLK signal. In summary, in this exemplary embodiment, when SCAN_MODE is low, SCLK remains deactivated. However, when SCAN_MODE is high, SCLK is activated and pulse in accordance to PULSE.

Figure 5:
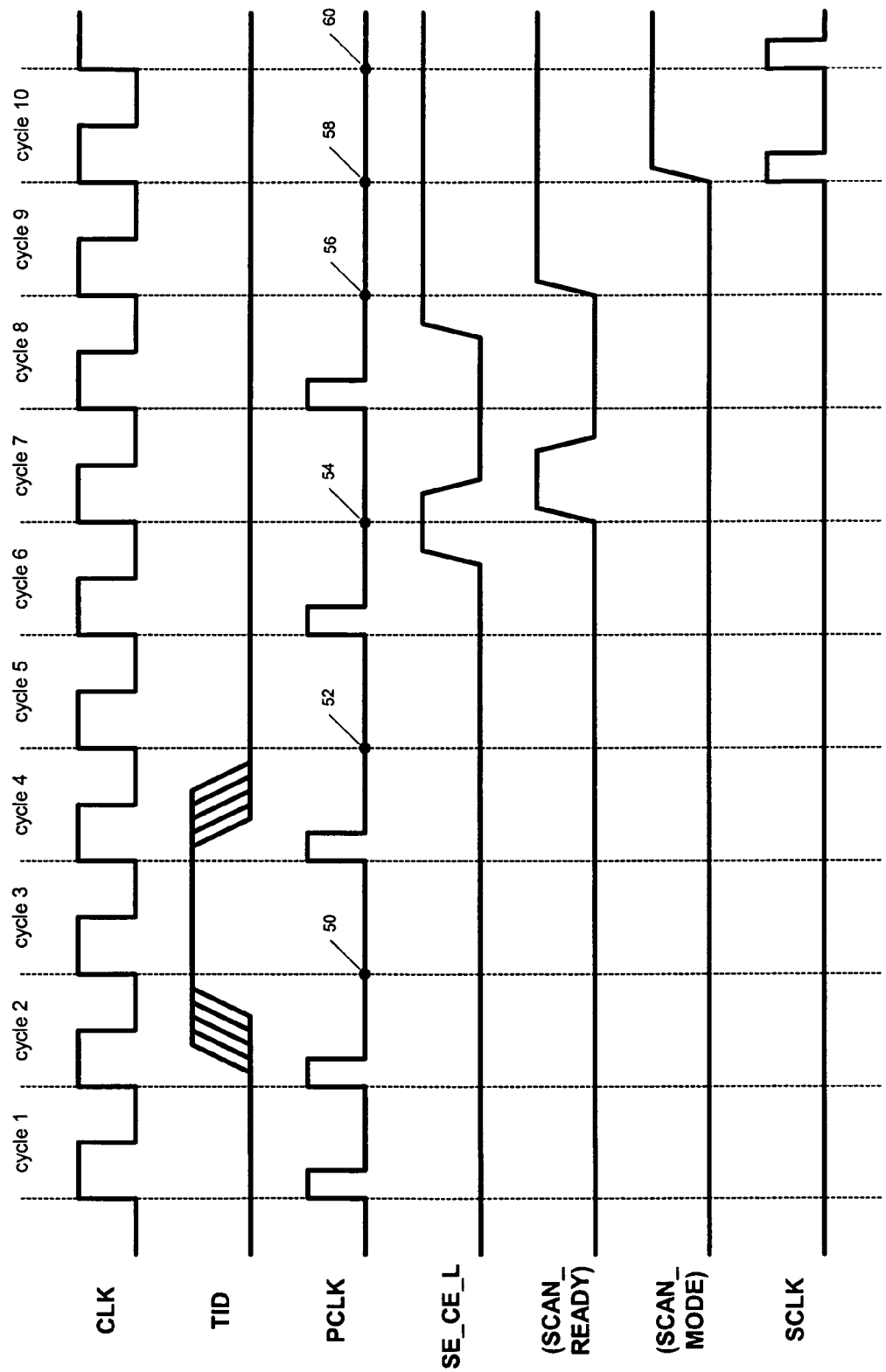
FIG. 5 is a timing diagram of the signals involved with a multiple-bit flip-flop in accordance with an embodiment of the present invention.

Referring to FIG. 5, a timing diagram of the signals involved with the header block (42) of the multiple-bit flip-flop (40) is shown in accordance with an embodiment of the present invention.

The CLK signal is the constant time reference for the header block (42). CLK is derived from the CPU clock, and the region between one rising edge in the signal to the next rising edge in the signal constitutes one complete clock cycle. The CLK signal will remain constant regardless of changes to any of the signals depicted in FIG. 5.

The local TID signal is generated by the clock/control header block (42) using the TID_G signal (shown in FIG. 3) to determine when a particular data storage element within the data storage block (44) should switch processes threads. The local TID signal, also known as the thread switch signal, is asserted through a toggle whenever the signal goes from high to low or low to high. For instance, in the exemplary embodiment of the present invention shown in FIG. 5, the local TID signal is activated twice, meaning that this exemplary embodiment requires the particular storage element in the data storage block (44) to change process threads twice. The process thread switching in FIG. 5 occurs in cycle 2 when the local TID signal goes from logic low to logic high and in cycle 4 when TID goes from logic high to logic low.

The PCLK signal in FIG. 5 represents a clock reference for the data storage block (44). PCLK is derived from the CLK signal through the clock/control header block (42). The PCLK signal has a rising edge synchronous to the rising edge of the CLK signal. PCLK is used as the clock reference when the multiple-bit flip-flop (40) is in normal mode.

The SE_CE_L signal represents the combined scan enable, clock enable, and clock disable functions. Although, SE_CE_L is implemented using one physical wire and shown in FIG. 5 as one waveform, those skilled in the art will appreciate that SE_CE_L performs multiple functions (discussed below).

The SCAN_READY and SCAN_MODE signals in FIG. 5 are internal signals within the clock/control header block (42) and do not get passed to the data storage block (44). These signals are entirely internal to the clock/control header block (42) and serve to distinguish what particular mode the multiple-bit flip-flop (40) should operate in. SCAN_READY serves as an intermediary signal between when SE_CE_L indicates that the multiple-bit flip-flop (40) should operate in scan mode and when the multiple-bit flip-flop (40) actually begins to operate in scan mode.

The SCLK signal in FIG. 5 represents the scan select pulse. The SCLK signal pulses when SCAN_MODE goes high. In other words, once the multiple-bit flip-flop (40) is in a scan mode based on SCAN_MODE going or being high, SCLK serves as the time reference for data scan operations within the data storage block (44). Additionally, when SCAN_MODE is asserted and SCLK begins to pulse, SI is selected by the data storage block (44) and used by the data storage block (44) for its scan operations.

The clock/control header block (42) comprises circuitry which is able to distinguish between the different functionalities of SE_CE_L. SE_CE_L can serve as a scan enable function, a clock enable function, and a clock disable function. Therefore, the behavior of the multi-functioning SE_CE_L signal must exhibit multiple functionalities that are decipherable and usable by the clock/control header block (42). Those skilled in the art will appreciate that in other embodiments, SE_CE_L, or another type of single physical signal, may be used for other functions.

The local TID signal, shown in the exemplary embodiment of the present invention in FIG. 5, toggles, i.e., signal goes from logic high to logic low or from logic low to logic high, to indicate to the data storage block (44) that it needs to switch process threads. A toggle is recognized only if it has completed toggling before CLK goes high in a particular cycle. As shown in FIG. 5, TID toggles in cycle 2 before CLK goes high. Likewise, in cycle 4, local TID toggles before CLK goes high. Furthermore, when local TID toggles, the PCLK signal is deactivated. In FIG. 5, the points (50, 52) represent cycles in which PCLK has been deactivated due to local TID toggles. Because the local TID toggle represents process thread switches, the PCLK must be deactivated in order to stop reading data while the data storage block (44) is switching process threads. For example, in the embodiment of the present invention shown in FIG. 5, the local TID toggles (from logic low to logic high) in cycle 2. Thereafter, the PCLK signal is deactivated so that data is not read while the data storage block (44) is switching process threads. By the end of cycle 3, the data storage block (44) is ready to read data for the new process thread, and therefore PCLK goes high to indicate to the data storage block (44) that it can read in data if needed. In cycle 4, the local TID toggles again (from logic high to logic low), and thereafter PCLK is deactivated while the data storage block (44) changes process threads so that data is not read in during the process thread change. By the end of cycle 5, the data storage block (44) is ready to perform normal data operations.

The multi-functioning SE_CE_L signal, shown in FIG. 5, exhibits scan enable, clock enable, and clock disable functions. The main purpose of a scan enable function, which is asserted in a scan mode, is to allow the user or user software to debug the software and/or hardware systems of the computer by allowing data and storage information to be scanned or seen. Typically, scan enable functionality is implemented so that it must be actively propagated for a plurality of CPU cycles in order to enter into the scan mode.

When the SE_CE_L signal goes high, the PCLK signal is deactivated in the cycle immediately following the cycle in which SE_CE_L goes high because when SE_CE_L goes high, this indicates to the clock/control header block (42) that the multiple-bit flip—flip (40) might enter a scan mode, and therefore, the data storage block (44) must stop using PCLK as its time reference. When SE_CE_L goes high, SCAN_READY, which is internal to the clock/control header block (42), goes high in the cycle immediately following the cycle in which SE_CE_L went high. If SE_CE_L goes low, then SCAN_READY accordingly goes low. However, when SE_CE_L goes low, SCAN_READY does not wait until the end of the cycle in which SE_CE_L went low in order to recognize the change in SE_CE_L. Once SE_CE_L goes low, SCAN_READY follows accordingly with minimal lag.

If SCAN_READY remains high at the end of the cycle in which it went high, then this indicates that SE_CE_L has remained high for more than one cycle, and therefore, SE_CE_L functions as a scan enable signal. When SCAN_READY is high at the end of the cycle in which it went high, the clock/control header block (42) circuitry asserts SCAN_MODE. The assertion of SCAN_MODE causes SCLK to begin pulsing and this indicates to the data storage block (44) that it should operate in scan mode.

To summarize, when SE_CE_L remains high for more than once cycle, the SE_CE_L signal functions as a scan enable signal, and the data storage block (44) enters scan mode based using SCLK as its time reference. The assertion of SCLK is dependent upon when SCAN_MODE goes high, and SCAN_MODE is dependent upon SCAN_READY, which in turn is dependent upon SE_CE_L.

Referring to FIG. 5, the SE_CE_L signal goes high in cycle 6. In cycle 7, the cycle immediately following the cycle in which SE_CE_L went high, SCAN_READY goes high and PCLK is deactivated (54). However, SE_CE_L goes low in cycle 7, and therefore SCAN_READY follows accordingly and goes low. Therefore, SCAN_MODE is not asserted because SCAN_READY is not high at the end of the cycle in which it went high. Moreover, PCLK is reactivated at the end of cycle 7 since SE_CE_L is not high at the end of cycle 7.

SE_CE_L also goes high in cycle 8. In cycle 9, which immediately follows the cycle in which SE_CE_L went high, SCAN_READY goes high and PCLK is deactivated (56). SE_CE_L remains high at the end of cycle 9, and therefore, SCAN_READY accordingly remains high at the end of cycle 9 and PCLK remains deactivated (low) (58). At the end of cycle 9, the clock/control header block (42) recognizes that SCAN_READY remains high at the end of the cycle in which it went high, and therefore, since SE_CE_L has been high for more than one cycle, SE_CE_L functions as a scan enable signal and SCAN_MODE is asserted in cycle 10. Correspondingly, SCLK begins to pulse in cycle 10, and this drives the data storage block (44) to suspend normal operations, select SI, and operate in scan mode. At the end of cycle 10, SE_CE_L remains high, and therefore, PCLK remains deactivated, SCAN_READY remains high, and SCAN_MODE and SCLK continue to be asserted.

SE_CE_L also functions as a clock enable signal. The clock enable function of SE_CE_L is an active low function, meaning that the clock enable function is asserted when the signal is low. When SE_CE_L is low at the rising edge of a cycle and given that a toggle has not occurred in the previous cycle, SE_CE_L serves as a clock enable signal. The clock enable function indicates to the clock/control header block (42) to operate the multiple-bit flip-flop (40) in normal mode and provide PCLK to the data storage block (44) as its time reference for performing normal data operations.

Referring to FIG. 5, SE_CE_L is low at the rising edges of cycle 1 and cycle 2, and therefore, it operates as a clock enable signal and PCLK is asserted in cycle 1 and cycle 2. At the rising edge of cycle 3, PCLK is deactivated (50) due to the TID toggle in cycle 2 (discussed above). At the rising edge of cycle 4, PCLK is asserted due to SE_CE_L being low and TID not toggling in cycle 3. Although, SE_CE_L is low at the rising edge of cycle 5, PCLK is deactivated (52) due to the TID toggle in cycle 4. At the rising edge of cycle 6, SE_CE_L is low, and because there is no TID toggle in the previous cycle, PCLK is asserted.

At the rising edge of cycle 7, SE_CE_L is high, and accordingly, PCLK is deactivated. In cycle 7, SE_CE_L goes low. Because SE_CE_L is high for less than one complete cycle, SE_CE_L does not serve as a scan enable signal. Instead, when SE_CE_L pulses high for less than one cycle, SE_CE_L functions as a clock disable function since it deactivates PCLK for one cycle. The clock disable function allows for the deactivation of PCLK for one cycle in order to perform flip-flop alignment operations.

One advantage of the present invention is that SE_CE_L can function as one of a plurality of signals. SE_CE_L, which is one physical signal, is capable of functioning as multiple signals. Because SE_CE_L is used as a multi-functioning signal, additional signal wires do not to be designated for the signals that are represented by SE_CE_L.

Another advantage is that vertical multi-threading, which requires a thread switch control signal, can be implemented within a microprocessor without additional wires. This results from the fact that because SE_CE_L is used for multiple functions, the thread switch control signal can use a pre-existing signal wire which was previously used as a signal that is now represented using SE_CE_L. This is desirable because if additional signal wires need to be implemented in the microprocessor, the circuitry of the entire microprocessor must be taken out and redesigned.

Another advantage of the present invention is that the circuitry within the clock/control header block (discussed above) takes up an equal or lesser amount of space than a clock/control header block which does not have the capability of using the multi-functioning signal.

Another advantage of the present invention is that it encourages vertical multi-threading, and, in effect, promotes increased processor performance. Because the multiple-bit flip-flops require no additional signals from the processor, a plurality of multiple-bit flip-flops can be placed at every stage of a processor pathway. As mentioned above, the multiple-bit flip-flops allow for efficient vertical multi-threading, and therefore increase processor throughput.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A system for implementing vertical threading in a processor, comprising:
 a header block that receives a multi-function signal and generates a plurality of signals using the multi-function signal; and
 a data storage block that is responsive to the plurality of signals generated by the header block,
 wherein the multi-function signal comprises a scan enable function, a clock enable function, and a clock disable function, and
 wherein the determination that the multi-function signal serves as the scan enable function indicates that the multiple-bit flip-flop should operate in a scan mode, and wherein the determination that the multi-function signal serves as the clock enable function indicates that the multiple-bit flip-flop should operate in a normal mode.

2. The system of claim 1, wherein the header block comprises header circuitry which distinguishes between different functionalities exhibited by the multi-function signal.

3. The system of claim 1, wherein the header block receives signals in addition to the multi-function signal.

4. The system of claim 3, wherein the additional signals received by the header block comprise a clock input signal and a global thread identifier signal.

5. The system of claim 4, wherein the global thread identifier signal is used by the processor to selectively indicate to the header block that the data storage block needs to switch process threads.

6. The system of claim 4, wherein the clock input signal is generated by the processor and is used by the header block to determine time references for operations in the header block.

7. The system of claim 1, wherein the plurality of signals generated by the header block comprise an external pulse signal, an inverted external pulse signal, a scan clock signal, and a local thread identifier signal.

8. The system of claim 7, wherein the external pulse signal is used by the data storage block as a time reference for operations in a normal mode.

9. The system of claim 7, wherein the inverted external pulse signal is an inverse of the external pulse signal, and wherein the inverted external pulse signal is used by the data storage block to facilitate operations in a normal mode.

10. The system of claim 7, wherein the scan clock signal is used by the data storage block as a time reference for operations in a scan mode.

11. The system of claim 7, wherein the local thread identifier signal is generated by the header block using a global thread identifier signal.

12. The system of claim 1, wherein the data storage block receives the plurality of signals generated by the header block, and wherein the header block and the data storage block are part of a multiple-bit flip-flop, and wherein the multiple-bit flip-flop is used in a processor pipeline.

13. The system of claim 12, wherein the processor pipeline comprises a plurality of multiple-bit flip-flops.

14. The system of claim 1, wherein the data storage block comprises at least one data storage element that is capable of storing data for a plurality of process threads.

15. The system of claim 1, wherein the header block controls a plurality of modes in which the data storage block may operate, and wherein the multi-function signal comprises additional functions.

16. A method for implementing vertical threading, comprising:
receiving a multi-function signal in a header block;
determining which function the multi-function signal serves;
generating signals within and from the header block according to the determination; and
operating a multiple-bit flip-flop in one of a plurality of operation modes dependent upon the determination of which function the multi-function signal serves,
wherein the multi-function signal can serve as a scan enable function, a clock enable function, and a clock disable function, and
wherein the determination that the multi-function signal serves as the scan enable function indicates that the multiple-bit flip-flop should operate in a scan mode, and wherein the determination that the multi-function signal serves as the clock enable function indicates that the multiple-bit flip-flop should operate in a normal mode.

17. The method of claim 16, wherein the signals generated from the header block are received by a data storage block.

18. The method of claim 17, wherein the data storage block operates in one of the plurality of operation modes dependent upon the signals generated from the header block.

19. The method of claim 16, wherein the determination of which mode to operate the multiple-bit flip-flop comprises:
distinguishing between multiple characteristics of the multi-function signal;
using the multi-function signal to generate intermediary signals; and
using the intermediary signals to determine when the multiple-bit flip-flop should go into or remain in one of the plurality of operation modes.

20. The method of claim 19, wherein the intermediary signals are internal to the header block, and wherein the plurality of operation modes comprise a normal mode and a scan mode.

21. The method of claim 16, wherein the determination that the multi-function signal serves as the clock disable function indicates that the multiple-bit flip-flop should temporarily suspend normal mode data operations for alignment purposes.

22. The method of claim 16, further comprising:
inputting a first clock signal;
inputting the multi-function signal;
inputting a global thread identifier signal; and
selectively generating an external pulse signal, a scan clock signal, and a local thread identifier signal dependent upon the behavior of the pulse signal, the multi-function signal, and the global thread identifier signal.

23. The method of claim 22, further comprising:
generating an internal pulse signal using the first clock signal; and
using the internal pulse signal to activate the external pulse signal when the multi-function signal serves as the clock enable function.

24. The method of claim 22, further comprising:
deactivating the external pulse signal when the multi-function signal begins to serve as the scan enable function.

25. The method of claim 22, further comprising:
activating the external pulse signal at an end of a clock cycle in which the multi-function signal begins to serve as the scan enable function when the multi-function signal begins to serve as the clock enable function before the end of the clock cycle.

26. The method of claim 22, further comprising:
deactivating the external pulse signal when the multi-function signal serves as the scan enable function for more than one clock cycle.

27. The method of claim 24, wherein the multiple-bit flip-flop operates in a scan mode when the multi-function signal serves as the scan enable function for more than one cycle.

28. The method of claim 27, further comprising:
activating the scan clock signal when the multiple-bit flip flop is in the scan mode.

29. The method of claim 22, further comprising:
deactivating the external pulse signal when the global thread identifier signal toggles;
selectively generating the local thread identifier signal when the global thread identifier signal toggles; and
activating the external pulse signal at an end of a clock cycle in which the global thread identifier signal toggled.

30. The method of claim 22, wherein the external pulse signal, the scan clock signal, and the local thread identifier signal are received by the data storage block, and wherein additional signals are selectively generated to the data storage block.

31. The method of claim 16, wherein the multiple-bit flip-flop operates in a normal mode when the external pulse signal is activated.

32. The method of claim 16, further comprising:
converting an existing processor without vertical threading into a processor with vertical threading without changing an architectural layout of the existing processor.

33. An apparatus for implementing a vertical threading scheme, comprising:
means for inputting a clock signal;
means for inputting a multi-function signal;
means for inputting a global thread identifier signal;
means for distinguishing between different functionalities of the multi-function signal to determine which of a plurality of functions the multi-function serves, wherein the plurality of functions comprises a scan enable function a clock enable function, and a clock disable function; and
means for generating a plurality of signals based on the determination of which of the plurality of functions the multi-function serves, the clock signal, and the global thread identifier signal, wherein the determination that the multi-function signal serves as the scan enable function indicates that the multiple-bit flip-flop should operate in a scan mode, and wherein the determination that the multi-function signal serves as the clock enable function indicates that the multiple-bit flip-flop should operate in a normal mode.

34. The apparatus of claim 33, wherein the plurality of signals comprises an external pulse signal, an inverted external pulse signal, a scan clock signal, and a local thread identifier signal.

35. The apparatus of claim 34, further comprising:

means for generating an internal pulse signal based on the behavior of the clock signal;

means for using the internal pulse signal as a time reference for operations;

means for using the internal pulse signal to generate the external pulse signal; and means for using the internal pulse to generate the inverted external pulse signal.

36. The apparatus of claim 34, further comprising:

means for deactivating the external pulse signal when the global thread identifier signal toggles;

means for reactivating the external pulse signal at an end of a cycle in which the global thread identifier signal toggled; and means for using the global thread identifier signal to generate the local thread identifier signal.

37. The apparatus of claim 34, further comprising:

means for deactivating the external pulse signal when the multi-function signal begins to serve as a scan enable function;

means for reactivating the external pulse signal dependent upon whether the multi-function signal stopped serving as a scan enable function before an end of a clock cycle in which the multi-function signal began serving as the scan enable function; and means for activating a scan clock signal when the multi-function signal serves as the scan enable function for more than one clock cycle.

38. The apparatus of claim 33, further comprising:

means for activating an internal scan ready signal at a beginning of a clock cycle immediately following a previous clock cycle in which the multi-function signal began serving as a scan enable function; and means for deactivating the internal scan ready signal when the multi-function signal stops serving as the scan enable function.

* * * * *